(12) United States Patent  
Jani

(10) Patent No.: US 8,683,899 B2
(45) Date of Patent: Apr. 1, 2014

(54) CHAIN CUTTER FOR CONTINUOUSLY FORMING CENTER-FILLED GUM PIECES

(75) Inventor: Bharat Jani, East Brunswick, NJ (US)

(73) Assignee: Intercontinental Great Brands, LLC, East Hanover, NJ (US)

( * ) Notice: Subject to any disclaimer, the term of this patent is extended or adjusted under 35 U.S.C. 154(b) by 719 days.

(21) Appl. No.: 12/680,255

(22) PCT Filed: Jun. 29, 2007

(86) PCT No.: PCT/US2007/072505
§ 371 (c)(1),
(2), (4) Date: Aug. 31, 2010

(87) PCT Pub. No.: WO2008/003083
PCT Pub. Date: Jan. 3, 2008

(65) Prior Publication Data
US 2010/0313719 A1    Dec. 16, 2010

Related U.S. Application Data

(60) Provisional application No. 60/817,637, filed on Jun. 29, 2006.

(51) Int. Cl.
*B26D 1/00* (2006.01)
*B26D 1/46* (2006.01)

(52) U.S. Cl.
USPC .................................. 83/13; 83/808

(58) Field of Classification Search
USPC .......... 83/13, 808; 426/5, 104, 233, 235, 512, 426/524, 3, 4, 516, 660, 414, 289; 425/233, 425/235, 237, 104
See application file for complete search history.

(56) References Cited

U.S. PATENT DOCUMENTS 325,711 A    9/1885  Stuckes, Jr.
810,210 A    1/1906  Laws
(Continued)

FOREIGN PATENT DOCUMENTS

EP    0086856 B1    7/1986
EP    0058946 B1    5/1987
(Continued)

OTHER PUBLICATIONS

Calpis Candy-Assortment, http://www.productscan.com/search/fullrecord.cfm?frprt=190448, Kanro, Publication Date May 25, 2000.

(Continued)

*Primary Examiner* — Ghassem Alie
(74) *Attorney, Agent, or Firm* — Hoffmann & Baron, LLP

(57) ABSTRACT

The present invention includes a chain type cutting apparatus for continuous cutting of a rope of a center-filled consumable product into individual pieces, which includes a first continuous elongate rotary chain with a plurality of first open die cavity portions and a second continuous elongate rotary chain with a plurality of second open die cavity portions. The first and second die cavity portions are mutually engageable to form a closed die cavity about a rope of center filled consumable product, forming pieces. The invention incorporates four main variables, dwell time, chain length, chain speed and the number of closed die cavities in simultaneous engagement. These four variables can be altered to increase the output of the product, as well as maintain a satisfactory seal of the center-filled consumable product.

13 Claims, 2 Drawing Sheets

(56) References Cited

U.S. PATENT DOCUMENTS

| | | | |
|---|---|---|---|
| 943,945 A | 12/1909 | Liebich | |
| 1,771,506 A | 7/1930 | Mustin | |
| 1,771,981 A | 7/1930 | Mustin | |
| 1,771,982 A | 7/1930 | Mustin | |
| 2,004,957 A | 6/1935 | Messner | |
| 2,448,786 A | 9/1948 | Faxon | |
| 2,651,573 A | 9/1953 | Leach | |
| 2,973,273 A | 2/1961 | Curtiss | |
| 3,071,476 A | 1/1963 | Werft et al. | |
| 3,795,748 A | 3/1974 | Cillario et al. | |
| 3,806,290 A | 4/1974 | Graff et al. | |
| 3,857,963 A | 12/1974 | Graff et al. | |
| 3,894,154 A | 7/1975 | Graff et al. | |
| 4,150,161 A | 4/1979 | Rudolph et al. | |
| 4,156,740 A | 5/1979 | Glass et al. | |
| 4,157,402 A | 6/1979 | Ogawa et al. | |
| 4,192,636 A | 3/1980 | Hayashi et al. | |
| 4,224,345 A | 9/1980 | Tezuka et al. | |
| 4,229,484 A | 10/1980 | Steels et al. | |
| 4,250,196 A | 2/1981 | Friello | |
| 4,251,201 A | 2/1981 | Krysiak | |
| 4,252,829 A | 2/1981 | Terrevazzi | |
| 4,269,860 A | 5/1981 | Ogawa et al. | |
| 4,271,197 A | 6/1981 | Hopkins et al. | |
| 4,292,329 A | 9/1981 | Ogawa et al. | |
| 4,301,178 A | 11/1981 | Witzel et al. | |
| 4,316,915 A | 2/1982 | Friello et al. | |
| 4,328,249 A | 5/1982 | Mackay et al. | |
| 4,329,369 A | 5/1982 | Tezuka et al. | |
| 4,352,823 A | 10/1982 | Cherukuri et al. | |
| 4,352,824 A | 10/1982 | Puglia et al. | |
| 4,352,825 A | 10/1982 | Cherukuri et al. | |
| 4,374,858 A | 2/1983 | Glass et al. | |
| 4,382,962 A | 5/1983 | Devos et al. | |
| 4,399,154 A | 8/1983 | Puglia et al. | |
| 4,421,773 A | 12/1983 | Akutagawa | |
| 4,430,351 A | 2/1984 | Cillario | |
| 4,466,983 A | 8/1984 | Cifrese et al. | |
| 4,485,118 A | 11/1984 | Carroll et al. | |
| 4,513,012 A | 4/1985 | Carroll et al. | |
| 4,543,769 A | 10/1985 | Schmitz | |
| 4,563,345 A | 1/1986 | Arrick | |
| 4,601,907 A | 7/1986 | Knebl et al. | |
| 4,614,654 A | 9/1986 | Ream et al. | |
| 4,614,658 A | 9/1986 | Wilson et al. | |
| 4,642,235 A | 2/1987 | Reed et al. | |
| 4,647,450 A | 3/1987 | Peters et al. | |
| 4,656,039 A | 4/1987 | Weiss et al. | |
| 4,683,138 A | 7/1987 | Glass et al. | |
| 4,707,363 A | 11/1987 | Sato et al. | |
| 4,721,198 A | 1/1988 | Yajima et al. | |
| 4,741,905 A | 5/1988 | Huzinec | |
| 4,753,806 A | 6/1988 | Carroll et al. | |
| 4,762,719 A | 8/1988 | Forester | |
| 4,783,854 A | 11/1988 | Björklund | |
| 4,872,884 A | 10/1989 | Cherukuri et al. | |
| 4,938,128 A | 7/1990 | Knebl | |
| 4,949,630 A | 8/1990 | Knebl | |
| 4,971,806 A | 11/1990 | Cherukuri et al. | |
| 4,975,288 A | 12/1990 | Hager et al. | |
| 4,980,178 A | 12/1990 | Cherukuri et al. | |
| 4,997,659 A | 3/1991 | Yatka et al. | |
| 5,045,326 A | 9/1991 | Glass et al. | |
| 5,116,626 A | 5/1992 | Synosky et al. | |
| 5,125,819 A | 6/1992 | Hager et al. | |
| 5,139,797 A | 8/1992 | Huzinec et al. | |
| 5,156,866 A | 10/1992 | Sato et al. | |
| 5,244,887 A | 9/1993 | Straub | |
| 5,279,842 A | 1/1994 | Escola Gallart et al. | |
| 5,344,659 A | 9/1994 | Kurihara et al. | |
| 5,399,365 A | 3/1995 | Yatka et al. | |
| 5,425,961 A | 6/1995 | Yatka et al. | |
| 5,431,929 A | 7/1995 | Yatka et al. | |
| 5,458,892 A | 10/1995 | Yatka et al. | |
| 5,498,429 A | 3/1996 | Orlandi et al. | |
| 5,502,045 A | 3/1996 | Miettinen et al. | |
| 5,525,360 A | 6/1996 | Yatka et al. | |
| 5,588,356 A | 12/1996 | Rizzi et al. | |
| 5,612,070 A | 3/1997 | Yatka et al. | |
| 5,626,892 A | 5/1997 | Kehoe et al. | |
| 5,626,896 A | 5/1997 | Moore et al. | |
| 5,637,334 A | 6/1997 | Yatka et al. | |
| 5,667,824 A | 9/1997 | Ream et al. | |
| 5,670,163 A | 9/1997 | Cuca et al. | |
| 5,750,170 A * | 5/1998 | Daouse et al. | 426/283 |
| 5,879,728 A | 3/1999 | Graff et al. | |
| 5,952,019 A | 9/1999 | Yatka et al. | |
| 5,955,116 A | 9/1999 | Kehoe et al. | |
| 6,054,144 A | 4/2000 | Burruano et al. | |
| 6,087,353 A | 7/2000 | Stewart et al. | |
| 6,264,999 B1 | 7/2001 | Yatka et al. | |
| 6,280,762 B1 | 8/2001 | Bealin-Kelly et al. | |
| 6,280,780 B1 | 8/2001 | Degady et al. | |
| 6,284,291 B1 | 9/2001 | Siecke et al. | |
| 6,306,429 B1 | 10/2001 | Bealin-Kelly | |
| 6,375,997 B1 | 4/2002 | Sheen et al. | |
| 6,422,853 B1 | 7/2002 | Markwardt et al. | |
| 6,432,441 B1 | 8/2002 | Bealin-Kelly et al. | |
| 6,472,001 B1 | 10/2002 | Bunkers et al. | |
| 6,491,540 B1 | 12/2002 | Barreca | |
| 6,528,102 B1 | 3/2003 | Coyle et al. | |
| 6,551,643 B2 | 4/2003 | Bernatz et al. | |
| 6,558,727 B2 | 5/2003 | Degady et al. | |
| 6,562,382 B1 | 5/2003 | Corriveau et al. | |
| 6,602,518 B2 | 8/2003 | Seielstad et al. | |
| 6,613,346 B2 | 9/2003 | Seielstad et al. | |
| 6,623,266 B2 | 9/2003 | Jani et al. | |
| 6,652,839 B2 | 11/2003 | Barreca | |
| 6,692,778 B2 | 2/2004 | Yatka et al. | |
| 6,759,079 B2 | 7/2004 | Klug et al. | |
| 6,838,098 B2 | 1/2005 | Bunkers et al. | |
| 6,846,495 B2 | 1/2005 | Dobrozsi et al. | |
| 6,869,614 B2 | 3/2005 | Barreca | |
| 6,949,264 B1 | 9/2005 | McGrew et al. | |
| 7,108,885 B2 | 9/2006 | Serpelloni | |
| 2002/0004083 A1 | 1/2002 | Yatka et al. | |
| 2002/0004086 A1 | 1/2002 | Zietlow et al. | |
| 2002/0051836 A1 | 5/2002 | Yatka et al. | |
| 2002/0136812 A1 | 9/2002 | Degady et al. | |
| 2002/0142059 A1 | 10/2002 | Jani et al. | |
| 2002/0192330 A1 | 12/2002 | Bunkers et al. | |
| 2003/0008062 A1 | 1/2003 | Day et al. | |
| 2003/0059501 A1 | 3/2003 | Rivier | |
| 2003/0068422 A1 | 4/2003 | Rivier | |
| 2003/0072841 A1 | 4/2003 | Rajaiah et al. | |
| 2003/0138518 A1 | 7/2003 | Kiefer et al. | |
| 2003/0185092 A1 | 10/2003 | Kimura et al. | |
| 2003/0190397 A1 | 10/2003 | Serpelloni | |
| 2003/0198713 A1 | 10/2003 | Clark et al. | |
| 2004/0037788 A1 | 2/2004 | Barreca | |
| 2004/0037924 A1 | 2/2004 | Jani et al. | |
| 2004/0037925 A1 | 2/2004 | Jani et al. | |
| 2004/0058033 A1 | 3/2004 | Sozzi et al. | |
| 2004/0096544 A1 | 5/2004 | Yatka et al. | |
| 2004/0126472 A1 | 7/2004 | Soldani | |
| 2004/0131751 A1 | 7/2004 | Dekker et al. | |
| 2004/0180110 A1 | 9/2004 | Mistry | |
| 2004/0234459 A1 | 11/2004 | Faust et al. | |
| 2005/0008732 A1 | 1/2005 | Gebreselassie et al. | |
| 2005/0100633 A1 | 5/2005 | Bunkers et al. | |
| 2005/0260317 A1 | 11/2005 | Cotten et al. | |
| 2005/0260329 A1 | 11/2005 | Yusuf et al. | |
| 2006/0024354 A1 | 2/2006 | Barreca | |
| 2006/0188612 A1 | 8/2006 | Lorenzi | |
| 2006/0280834 A1 | 12/2006 | Jani et al. | |
| 2007/0003663 A1 | 1/2007 | Jani et al. | |
| 2007/0087100 A1 | 4/2007 | Fornaguera | |
| 2007/0104828 A1 | 5/2007 | Fornaguera | |
| 2007/0104830 A1 | 5/2007 | Fornaguera | |

(56) References Cited

U.S. PATENT DOCUMENTS

| | | |
|---|---|---|
| 2007/0122528 A1 | 5/2007 | Cathenaut et al. |
| 2007/0148285 A1 | 6/2007 | Yang |
| 2007/0160707 A1 | 7/2007 | Garcia |

FOREIGN PATENT DOCUMENTS

| | | |
|---|---|---|
| EP | 0320580 B1 | 7/1993 |
| EP | 1151673 A2 | 11/2001 |
| EP | 0944331 B1 | 3/2002 |
| EP | 0806151 B1 | 11/2002 |
| EP | 1004594 B1 | 8/2003 |
| EP | 0977553 B1 | 9/2003 |
| EP | 1000551 B1 | 11/2003 |
| EP | 1003475 B1 | 1/2004 |
| EP | 0977554 B1 | 6/2004 |
| EP | 1425976 A1 | 6/2004 |
| EP | 1280414 B1 | 9/2005 |
| EP | 1699297 B1 | 6/2008 |
| EP | 1959587 A1 | 8/2008 |
| GB | 2177587 A | 1/1987 |
| JP | 4179445 | 6/1992 |
| JP | 09-009944 A | 1/1997 |
| WO | 9508925 A1 | 4/1995 |
| WO | 9706695 A1 | 2/1997 |
| WO | 0006127 A1 | 2/2000 |
| WO | 0019977 A1 | 4/2000 |
| WO | 0167884 A1 | 9/2001 |
| WO | 0182716 A1 | 11/2001 |
| WO | 02/15708 A2 | 2/2002 |
| WO | 02/056697 A1 | 7/2002 |
| WO | 02056698 A1 | 7/2002 |
| WO | 2005048728 A1 | 6/2005 |
| WO | 2006026298 A2 | 3/2006 |
| WO | 2006077480 A1 | 7/2006 |
| WO | 2007079333 A2 | 7/2007 |

OTHER PUBLICATIONS

Centres for High Boilings ň Fruit Pulp, Caramel. Treacle or Powder, By Sweetmaker, Confectionery Production vol. 48, Aug. 1982, pp. 344-345.

Chewels Sugarless Gum, http://www.productscan.com/search/fullrecord.cfm?frprt=11085, Warner-Lambert Company, Publication Date Oct. 17, 1983.

Deis, Ronald PhD, "Polyols in Confectionery," The Manufacturing Confectioner, Oct. 2000, pp. 53-57.

DIALOG® File 636: Gale Group Newsletter DB™ © 2006 The Gale Group, Mega Warheads Fruit Flavored Candy-Sour Lemon; Fruit Flavored Candy; Sour Apple; Fruit Flavored Candy-Hot Grape; Fruit Flavored Candy-Hot Cherry Manufacturer: Foreign Candy Co., Inc. Category: Non-Chocolate Candies, Jun. 8, 1992.

DIALOG® File 636: Gale Group Newsletter DB™ © 2006 The Gale Group, Orange Pure Sherbert Candy; Lemon Pure Sherbert Candy Manufacturer: Senjakuame Honpo Category: Non-Chocolate Candies, Nov. 6, 1991.

Freshen-up Fruit Gum, http://www.productscan.com/search/fullrecord.cfm?frprt=336, Warner-Labmert Company, Publication Date Feb. 4, 1980.

Freshen-up Peppermint Gum; Freshen-up Fruit Gum, http://www.productscan.com/search/fullrecord.cfm?frpt=9657 Warner Lambert Company, Publication Date Aug. 23, 1982.

Fritz, Douglas P., "Using Confectionery Equipment to Manufacture Chewing Gum," The Manufacturing Confectioner, Nov. 2000, pp. 45-48.

Gonze et al., "High Purity Erythritol for New Health Food Applications," Focus International.

Hintlian, Fred, "Filled Hard Candy," The Manufacturing Confectioner, Oct. 1995, pp. 61-66.

Hume, J., Notebook of a Practical Confectioner V. Continuation of Receipes for Centres Confectionery Production vol. 44, Jan. 1978, pp. 18, 20.

Hyvoenen et al., "Food Technological Evaluation of Xylitol" Advances in Food Research, vol. 28, 1982, pp. 373-403.

International Search Report for Patent Application No. PCT/US08/71216, dated Oct. 15, 2008.

International Search Report for Patent Application No. PCT/US08/71226 dated Oct. 22, 2008.

Jackson, E.B. "Cerelose-The Confectionery Industry's Natural Sweetner," Confectionery Manufacture and Marketing vol. 28, Jun. 1991, No. 6, pp. 20-22.

Jackson, E.B., "Cerelose ň It's role in improved Confectionery," Confectionery Production vol. 57 Jan. 1991, No. 1, pp. 79-91.

Kacena, R., "Hard Coat Panning," The Manufacturing Confectioner, Oct. 1997, pp. 41-45.

Kanro 10 Tsubu Hinyari Suika Nodoame 10 Candy, http://www.productscan.com/search/fullrecord.cfm?frprt=236668, Kanro, Publication Date Jul. 25, 2002.

Lieberman et al., "Pharmaceutical Dosage Forms," Tablets vol. 1, pp. 386-399, Date 1980.

Long, Tim, "Producing Center Filled Hard Candy, Chewing Gums and Toffees," Candy & Snack Industry, Nov. 1980, pp. 34, 37.

McIntyre, Malcom, "Isomalt as an International Sugar Replacer" Sweeteners.

Newsletter, Candy Industry, pp. 10.

Ninja Club, http://www.productscan.com/search/fullrecord.cfm?frpt=31492, Kanebo Shokuhin, Publication Date Dec. 3, 1986.

Rogers, Paul, "Helping the Medicine Go Down," Candy Industry, May 2001, pp. 37, 38, 40.

Stingers Taffy Bar-Lemon; Raspberry; Fruit Punch, http://www.productscan.com/search/fullrecord.cfm?frpt=118695.

* cited by examiner

CHAIN CUTTER FOR CONTINUOUSLY FORMING CENTER-FILLED GUM PIECES

CROSS-REFERENCE TO RELATED APPLICATIONS

This application is the national stage of International Application No. PCT/US2007/072505, filed Jun. 29, 2007, which claims the benefit of U.S. Provisional Application No. 60/817,637, filed Jun. 29, 2006, the contents of which are incorporated by reference herein.

FIELD OF THE INVENTION

The present invention relates generally to a method and an apparatus for forming individual center-filled gum pieces from a continuous rope or strand. More particularly, the present invention relates to a chain cutter for cutting the rope or strand into individual pieces.

BACKGROUND OF THE INVENTION

Center-filled confectionery products are known. These products typically have a solid or semi-solid exterior and a soft liquid, semi-liquid, or soft solid center. One well known example of such center-filled confectionery products are liquid filled gum products.

A typical process for forming center-filled gum pieces is to extrude a continuous rope or strand of material into a hollow tubular configuration, and filling with a soft or liquid center. This rope or strand is fed between the dies of a chain cutter and continuously cut into individual pieces. The process and apparatus for the formation of center-filled gum pieces is more fully described in U.S. Pat. Nos. 6,838,098; 6,558,727; 6,472,001; and 6,284,291. Each of these patents is incorporated by reference herein for all purposes.

The chain cutter not only cuts the rope into individual pieces it also seals the ends of the pieces thereby closing the liquid center within the outer exterior portion. If the ends of the gum pieces are not properly sealed, undesirable release of the center-fill composition may occur.

One factor in assuring that a proper seal is provided when cutting the rope into individual pieces is the dwell time in which the rope is contained within the dies of the chain cutter. If the rope remains within the die over an extended period of time, a better seal will be obtained. This heretofore could only be obtained by slowing the rotation of the chain die to maintain a satisfactory dwell time. As may be appreciated, however, this reduces the efficiency of the manufacturing process by slowing the rate at which center-filled gum pieces can be formed.

It is desirable to provide a chain cutter which can be run at higher speeds to increase efficiency, yet not decrease the dwell time so as to adversely affect the sealing of the individual pieces. It is desirable to provide a chain type cutting apparatus which uses a dwell time similar to the dwell time of existing chain type cutting apparatus, while using more simultaneously closed dies than that of existing chain type cutting apparatus.

It is desirable to provide an improved chain cutter, wherein the speed can be increased, and/or the chain length can be increased to improve the output of individual pieces. Having a satisfactory dwell time is important to achieve an improved sealing, reduced leakage, and improved manufacturing.

SUMMARY OF THE INVENTION

The present invention provides a chain type cutting apparatus for continually cutting a rope of a center-filled consumable product into individual pieces. The cutting apparatus includes a first continuous elongate rotary chain defining a plurality of first open die cavity portions. A second continuous elongate rotary chain is provided defining a plurality of second open die cavity portions. The first and second die cavity portions are mutually engageable to form a closed die cavity about the rope of product thereby forming the pieces. A plurality of the first and second die cavity portions are in simultaneous engagement along a substantial length of the chain to form a plurality of simultaneously closed die cavities.

More particularly, each of the chains is supported by two spaced apart rollers and the plurality of cavities that are in simultaneous engagement extends substantially between the rollers.

In a method aspect, a method of continuously forming a plurality of discrete pieces of center-filled confectionery product from an elongate rope is provided. The method includes the steps of feeding the rope between first and second elongate rotating chains where each chain defines a plurality of mutually engageable open die cavity portions. Thereafter, a plurality of the die cavity portions is simultaneously closed about the rope along an extended length thereof to cut the rope into discrete pieces.

In one embodiment there is provided a chain type cutting apparatus for continuous cutting of a rope of a center-filled consumable product into individual pieces including a first continuous elongate rotary chain defining a plurality of first open die cavity portions and a second continuous elongate rotary chain defining a plurality of second open die cavity portions, the first and second die cavity portions being mutually engageable to form a closed die cavity about the rope of product, thereby forming the pieces, the product remaining within the closed die cavity for a dwell time, wherein the number of the first and second die cavity portions being in simultaneous engagement being at least about 7.

In another aspect of the invention, there is provided a method of continuously forming a plurality of discrete pieces of a center-filled confectionery product from an elongate rope thereof comprising the steps of feeding the rope between a first and second elongate rotating chains, each the chain defining a plurality of mutually engageable open die cavity portions, simultaneously closing a plurality of the die cavity portions about the rope along an extended length to cut the rope into the discrete pieces, wherein the number of the closed die cavities is at least about 10.

In another aspect of the invention, there is provided a method of improving the output of a chain type cutting apparatus having a pair of rotary chains including a plurality of die cavity portions which are mutually engageable to form a plurality of closed die cavities to continuously cut a rope of center-filled confectionery product into individual pieces; the method includes the steps of establishing a minimal dwell time to maintain the rope in the mutually engageable closed die cavities for effectively sealing the individual pieces, and establishing the number of the closed die cavities and speed of rotation of the rotating chains such that the minimum dwell time is maintained.

In another embodiment of the invention, there is provided an improved chain type cutting apparatus for continuous cutting of a rope of a center-filled consumable product into individual pieces which includes a first continuous elongate rotary chain defining a plurality of first open die cavity portions, and a second continuous elongate rotary chain defining a plurality of second open die cavity portions, and the first and second die cavity portions being mutually engageable to form a closed die cavity about the rope of product, thereby forming the pieces, the product remaining within the closed die cavity for a dwell time, wherein the improvement includes an increased number of closed die cavities in contact with the rope over that of an existing chain type cutting apparatus.

In yet another aspect of the invention, there is provided an improved chain type cutting apparatus for continuous cutting of a rope of a center-filled consumable product into individual pieces which includes a first continuous elongate rotary chain defining a plurality of first open die cavity portions, and a second continuous elongate rotary chain defining a plurality of second open die cavity portions, and the first and second die cavity portions being mutually engageable to form a closed die cavity about the rope of product, thereby forming the pieces, the product remaining within the closed die cavity for a dwell time, wherein the improvement includes a length between the rollers substantially longer than that of an existing chain type cutting apparatus.

Another embodiment of the invention provides an improved method of continuously forming a plurality of discrete pieces of a center-filled confectionery product from an elongate rope thereof which includes the steps of feeding the rope between a first and second elongate rotating chains, each the chain defining a plurality of mutually engageable open die cavity portions, simultaneously closing a plurality of the die cavity portions about the rope along an extended length to cut the rope into the discrete pieces, wherein the improvement includes increasing the time in which the product remains within the closed die cavities while maintaining or increasing the rotational speed of the chains of an existing method of continuously forming a plurality of pieces of center-filled confectionery product.

In another aspect of the invention, there is provided a chain type cutting apparatus for continuous cutting of a rope of a center-filled consumable product into individual pieces comprising a first continuous elongate rotary chain defining a plurality of first open die cavity portions and a second continuous elongate rotary chain defining a plurality of second open die cavity portions, the first and second die cavity portions being mutually engageable to form a closed die cavity about the rope of product, thereby forming the pieces, the product remaining within the closed die cavity for a dwell time, wherein each of the first and second chains has a major diameter length and the chain defines a length of closed die cavities and wherein the ratio of the closed die cavity length to the major diameter length is about 0.3-0.6 to 1.

Another aspect of the invention provides a method of improving the output of a chain type cutting apparatus having a pair of rotary chains including a plurality of die cavity portions which are mutually engageable to form a plurality of closed die cavities to continuously cut a rope of center-filled confectionery product into individual pieces; the method includes the steps of establishing a first dwell time to maintain the rope in the mutually engageable closed die cavities for effectively sealing the individual pieces, establishing a number of closed die cavities, and establishing a speed of rotation of the rotating chains such that the first dwell time is at least maintained for the number of closed die cavities.

In another embodiment, there is provided a method of improving the output of a chain type cutting apparatus having a pair of rotary chains including a plurality of die cavity portions which are mutually engageable to form a plurality of closed die cavities to continuously cut a rope of center-filled confectionery product into individual pieces; the method includes the steps of establishing a first dwell time to maintain the rope in the mutually engageable closed die cavities for effectively sealing the individual pieces, establishing a speed of rotation of the rotating chains, and establishing a number of closed die cavities such that the first dwell time is at least maintained for the speed of rotation of the rotating chains.

The apparatus, in one embodiment, also provides a pressure plate for engagement with one of the chains for urging the plurality of cavities into the closed engagement.

The method in one embodiment includes urging one of the chains into engagement with the other chain to maintain the plurality of die cavities in the closed position.

DETAILED DESCRIPTION OF THE PREFERRED EMBODIMENT

Figure 1:
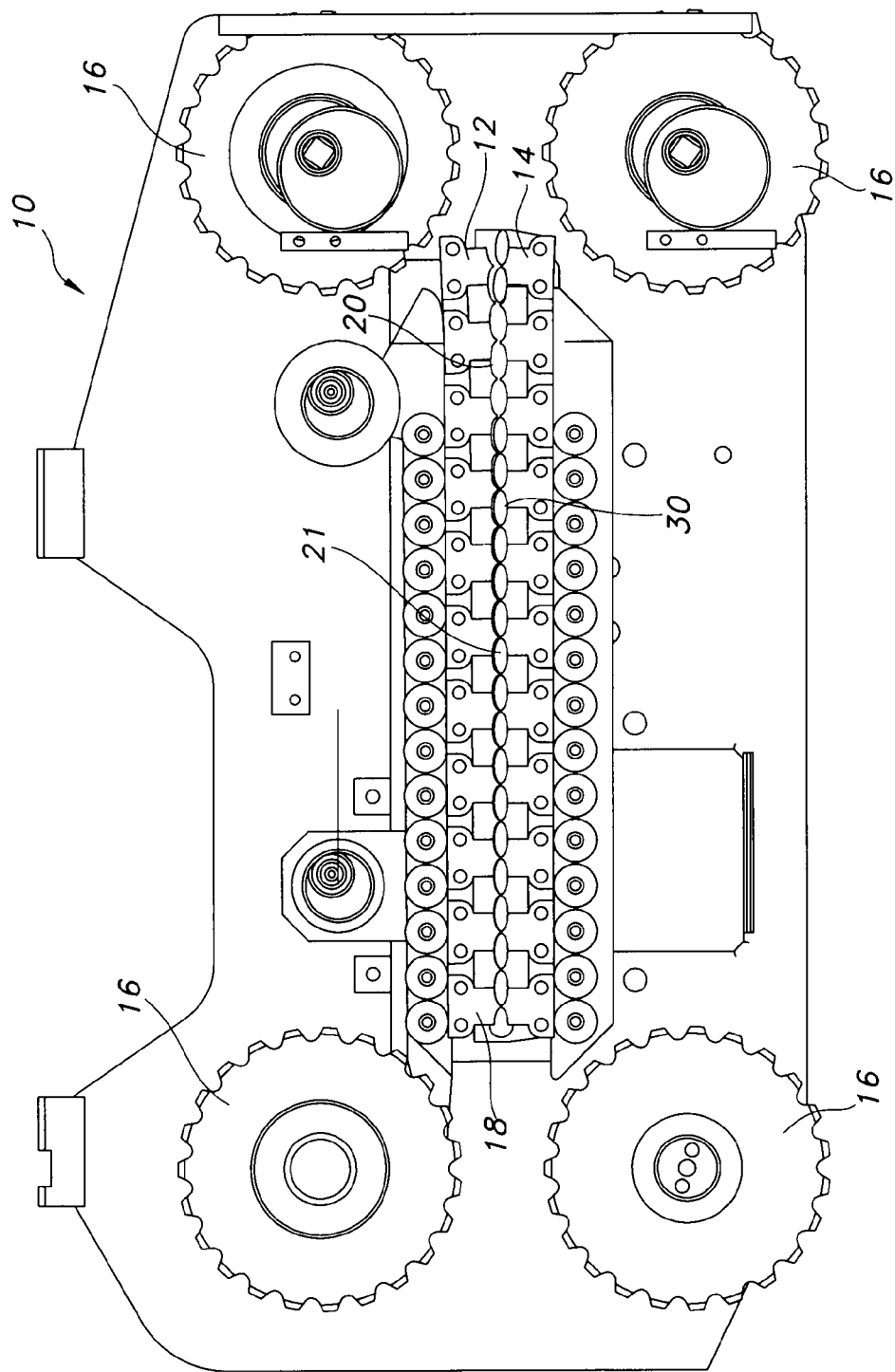
FIG. 1 shows the exemplary chain cutter of the present invention showing center-filled gum pieces contained within the die.

The chain cutter apparatus 10 includes a pair of continuous chains 12 and 14. Each chain is supported for continuous rotation about a pair of spaced apart rollers 16. Each chain defines a die portion 18 which includes an open die cavity portion 20. The open die cavity portions 20 of one chain 12 are alignable with the open die cavity portions 20 of the other chain 14 to form a closed die cavity 21.

As described in the above-referenced incorporated patents, a rope of product, preferably center-filled gum, is fed between the open die cavities of the chains 12 and 14. The die cavity portions 20 are then closed about the rope of product effectively forming and cutting the rope into a plurality of discrete pieces 30. Continuing movement of the chain expels the individual pieces in a manner described with respect to the above-referenced incorporated patents.

Figure 2:
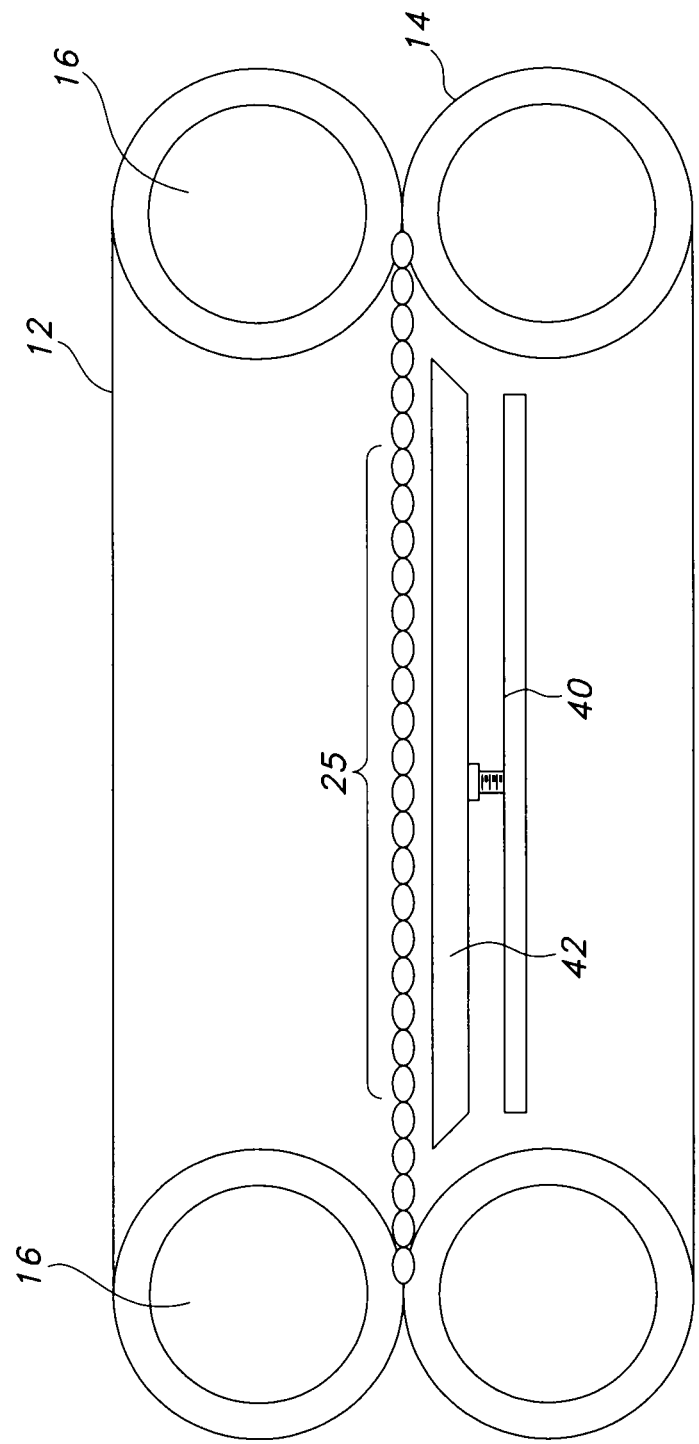
FIG. 2 is a schematic representation of the exemplary improved chain cutter of the present invention for use in combination with apparatus for the formation of center-filled gum pieces described more fully in the above-incorporated patent.

Referring now to FIG. 2, the chains 12 and 14, as well as the rollers 16, are shown schematically. The present invention provides chain cutting apparatus having a length, as measured between the rollers, which is substantially longer than that of existing chain cutters. This is provided so as to increase the residence time in which the product remains within the closed die cavities while not having to reduce the rotational speed of the chain. This is also referred to as dwell time.

Chain cutting apparatus 10 shown in FIG. 2 provides for an increased number of die cavities which are simultaneously closed about the rope. By increasing the number of die cavities closed around the rope, the chain die may be run at an increased linear speed while maintaining the dwell time of the rope in the closed die. The present invention seeks to establish the speed at which the chain cutter is run. This may be accomplished by increasing the number of dies that are closed about the rope so as to maintain a minimum dwell time of the product within the closed die.

In this manner, the chain cutter apparatus 10 may be run at an increased speed while still maintaining an minimum dwell time of the product within the closed die. Such minimum dwell time is a time sufficient for the closed die to provide an effective seal for the center filled product thereby preventing leakage of the center fill therefrom. As may be appreciated, the dwell time of the product within the closed die is dictated by the number of simultaneously closed dies about the product and the speed at which the chains 12 and 14 rotate.

As shown in FIG. 2, the length of the chain is measured between the spaced apart rollers 16 is such that preferably eighteen chain links 25 remain in contact in closed position about the rope product fed therebetween. Thus, as an individual closed die traverses from one end of the chain to the other between rollers 16, the product remains within the closed die over an extended period. Such an arrangement enhances the ability for the product to be sealed which is especially important with center-filled gum products so as to prevent release of the center-fill composition from the formed piece. The longer chain die has a specially designed cam mechanism to allow for increased contact between the upper and lower chains 12 and 14. Moreover, depending upon the particular product employed, the design incorporates the flexibility to increase or decrease contact area between the upper and lower chains.

In one embodiment, eighteen die cavities are used with respect to maintaining the products in the closed die cavities. In some embodiments, the number of closed die cavities may include at least about 7 closed die cavities. In some embodiments, the number of closed die cavities may include at least about 10, and in some embodiments, the number of closed die cavities may include at least about 18 closed die cavities. In some embodiments, the number of closed die cavities may have about 10 to about 20 closed die cavities. In those ranges of increase in the number of cavities, an increase in linear speed of the chains can be varied from 0% faster to 100% faster than that which is conventionally employed while maintaining a minimum dwell time. In some embodiments, the speed of the chain can be from about 30 m/min to about 200 m/min. In other embodiments, the speed of the chain may be from about 50 m/min to about 200 m/min. In other embodiments, the speed of the chain may be about 100 m/min to about 200 m/min. In other embodiments, the speed of the chain may be about 100 m/min. In other embodiments, the speed of the chain may be about 150 m/min.

Improvements can be seen with respect to a comparison to the existing chain cutting apparatus such as those shown in the above-referenced incorporated patents. For example, in one existing design, the number of chain links and contacts is four, while in the longer chain die of the present invention eighteen links are in contact. The chart shown in Table 1 below shows the comparison between the existing production chain die and the improved longer chain die, taking into consideration parameters such as the length of each link, the total contact length, the die speed and the average residence time.

As can been seen in Table 1 the longer chain of the chain die places significantly more closed cavities in contact with the rope, this results in the increased residence (dwell) time of the rope in the closed die at comparable speeds. This, therefore, allows the chain die to be run at faster speeds than the existing chain dies while maintaining comparable dwell times. The speed of rotation of the chain cutter may be increased over a previous speed, and the number of closed die cavities may also be increased over a previous number of closed die cavities. For example, Table 1 shows that when run at a speed of 50 m/min, the longer chain increases the dwell time of the rope in the closed die from 0.0960 in the existing design to 0.4320 in the design of the present invention.

Depending on the chain cutter's configuration, the major diameter length, the number of the chain dies in contact, the chain speed, and the dwell time may vary. For example, in some existing chain cutters, the major chain length may be 400 mm, the number of chain dies in contact may be from four to nine, and the chain speed may be from 50 m/min to 100 m/min. For example, the improved chain cutter may have a major chain length of about 600 mm; the number of chain dies in contact in the improved chain cutter may be at least about 10, may be at least about 15, or may be at least about 15 to about 20; the chain speed in the improved chain cutter may be from about 30 m/min to about 200 m/min, or may be from about 100 m/min to about 200 m/min; and the dwell time in the improved chain cutter may be from about 0.1 to about 0.5 seconds.

Thus, if one establishes a minimum dwell time, the design of the present invention allows running the chain at a higher speed while maintaining that minimum dwell time. Operating at a higher speed increases the output of the overall process.

Furthermore, the increase in the number of closed die cavities over that of the previously used dies may be achieved by increasing the length of the chains. An increase in the number of closed dies allows for a decrease in speed of the chain while still maintaining the output of the process. Likewise increasing the speed of the chain allows for a decrease in number of closed dies while maintaining the output of the process.

As can be seen, the invention considers four main variables: dwell time, chain length, chain speed and the number of closed die cavities in simultaneous engagement. These four variables can be altered to increase the output of the product. By way of example, the output can be increased by increasing

TABLE 1

| Chain Die Type | Number of chain links in contact | Length of each link, mm | Total contact length, mm | Die Speed, meters/min | Average residence time, sec |
|---|---|---|---|---|---|
| Existing Production Die | 4 | 20.00 | 80.00 | 50.00 | 0.0960 |
| Existing Production Die | 4 | 20.00 | 80.00 | 60.00 | 0.0800 |
| Existing Production Die | 4 | 20.00 | 80.00 | 70.00 | 0.0686 |
| Existing Production Die | 4 | 20.00 | 80.00 | 80.00 | 0.0600 |
| Existing Production Die | 4 | 20.00 | 80.00 | 90.00 | 0.0533 |
| Existing Production Die | 4 | 20.00 | 80.00 | 100.00 | 0.0480 |
| Longer Chain Die | 18 | 20.00 | 360.00 | 50.00 | 0.4320 |
| Longer Chain Die | 18 | 20.00 | 360.00 | 60.00 | 0.3600 |
| Longer Chain Die | 18 | 20.00 | 360.00 | 70.00 | 0.3086 |
| Longer Chain Die | 18 | 20.00 | 360.00 | 80.00 | 0.2700 |
| Longer Chain Die | 18 | 20.00 | 360.00 | 90.00 | 0.2400 |
| Longer Chain Die | 18 | 20.00 | 360.00 | 100.00 | 0.2160 | the speed of the chain. If the speed is increased, in order to maintain a minimum dwell time, the length of the chain and/or the number of simultaneously closed die cavities should be increased. Similarly, if the dwell time is to be increased, the chain speed can be decreased, or the length of the chain and/or the number of simultaneously closed die cavities can be increased. If the length of the chain is increased, to maintain the necessary minimum dwell time, the speed of the chain and/or the number of simultaneously closed die cavities can be increased. Finally, if the number of simultaneously closed die cavities is to be increased, the speed of the chain and/or the length of the chain can be increased in order to maintain minimum dwell time. While the four variables are discussed herein, it is appreciated that there are other variables that will necessarily have an effect on the process described herein.

In one embodiment, the existing chain cutter employs a length as measured between the spaced apart rollers of the chain (major diameter length) of about 400 mm, and four closed die cavities having a closed length of about 80 mm. In some embodiments, the improved chain cutter employs a major diameter of about 600 mm as measured between the rollers, and eighteen closed die cavities having a closed length of about 360 mm. This arrangement allows maintenance of the minimum dwell time while running the chain at higher speeds. Preferably, the chain cutter has about 10 to about 20 simultaneous closed die cavities, having a closed die cavity length of from about 200 mm to about 400 mm. In other embodiments, the chain speed is increased about 2 to about 4 times that of existing chain cutters.

Accordingly, the ratio of these closed die cavities per unit length of the chain (as measured between the rollers) to the major diameter length increases from about ⅕ in the above existing embodiment to about ⅓ to about ⅔, which represents about a 170% to about a 330% increase over existing chain cutters. In other embodiments, the improved chain cutter increases the number of closed dies in simultaneous engagement and/or the length from about 1.5 to about 6 times that of existing chain cutters, while maintaining or increasing the chain die speed. In some embodiments, the chain die speed is increased about 2 to 4 times that of existing chain cutters.

Moreover, as shown in FIG. 2, there is provided a pressure plate 40. The pressure plate includes an engagement surface 42 which may be moved into engagement with one of the chains 14 to urge the chain 14 into closed contact with chain 12 thereby maintaining the closed configuration and further assuring proper formation of the individual pieces.

As may be appreciated, optionally, an anti-sticking agent may be used in conjunction with the rope sizer, to prevent the rope from adhering to the rollers and getting stuck, which would decrease productivity. Generally, anti-sticking agents may be in the form of powders such as talc, calcium carbonate, or oils. For example, a fine mist of a food grade oil or an oil-based material may be sprayed on the rollers and material engaging surfaces of the rope sizer before or as the rope of gum material makes contact with the rollers. The oil temporarily reduces or eliminates the stickiness of the gum material and allows it to be sized without the need to cool the rollers with cooled air or nitrogen gas. In the alternative or in addition, it is also possible to apply the oil material directly on the rope of gum material. Suitable food grade oil or oil-based materials include, but are not limited to almond oil, apricot kernel oil, avocado oil, black cumin seed oil, borage seed oil, camellia oil, castor oil, cocoa oil, coconut oil, corn oil, cottonseed oil, evening primrose seed oil, grapeseed oil, hazelnut oil, hemp seed oil, jojoba oil, karanja oil, kukui nut oil, macadamia nut oil, meadowfoam seed oil, neem seed oil, olive oil, palm oil, peanut oil, pumpkin seed oil, rosehip seed oil, safflower oil, sea buckthorn oil, sesame seed oil, shea nut oil, soybean oil, sunflower oil, tamanu oil, vitamin E oil, and wheat germ oil. Synthetic oils may also be used.

In an embodiment, the apparatus may be kept at a reduced temperature in order to prevent the confectionery material from sticking to the various parts described herein. For this purpose, cooled air or gas may be directed toward the rollers, the relaxation conveyor, the cutting apparatus, or any other part of the system in which the confectionery may potentially stick. The cooling air may flow directly at the surface of the parts to maintain it at a pre-determined temperature. In another embodiment, the parts themselves may be chilled, such as using a chilled extruder, a chilled rope sizer, a chilled relaxation conveyor and/or a chilled cutting apparatus. Such cooling may be achieved through use of cooled fluid, such as water, liquid nitrogen, or other fluid. In an embodiment, the center fill material may be cooled upon exit from the filling apparatus. Using cooled center fill material will have the effect of cooling the outer confectionery portion from the inside. The temperature of the parts is preferably maintained below about −90.degree.F, although the actual temperature will vary with the material and production rate. The individual parts and/or the confectionery itself may be cooled at any temperature from about −100.degree.F to about 50.degree.F. In order to control costs of manufacture, the temperature should be just cold enough to support production, while inhibiting sticking of the confectionery.

While the invention has been described in related to the preferred embodiments, it will be understood by those skilled in the art that various changes may be made without deviating from the fundamental nature and scope of the invention as defined in the appended claims.

What is claimed is:

1. A chain type cutting apparatus for continuous cutting of a rope of a center-filled consumable product into individual pieces comprising:
 a first continuous elongate rotary chain defining a plurality of first open die cavity portions; and
 a second continuous elongate rotary chain defining a plurality of second open die cavity portions;
 said first and second die cavity portions being mutually engageable to form a closed die cavity about said rope of product, thereby forming said pieces, said product remaining within said closed die cavity for a dwell time;
 wherein the number of said first and second die cavity portions being in simultaneous engagement being at least about 10;
 wherein said first and second chains are rotatable at a speed of from about 30 m/min to about 200 m/min, and
 wherein each of said first and second chains has a major diameter length and said chain defines a length of said first and second die cavity portions being in simultaneous engagement, and wherein the ratio of said length of said first and second die cavity portions being in simultaneous engagement to the major diameter length is from about 0.3-0.6 to 1.

2. An chain type cutting apparatus of claim 1 wherein said dwell time is between about 0.1 seconds to about 0.5 seconds.

3. A method of continuously forming a plurality of discrete pieces of a center-filled confectionery product from an elongate rope thereof comprising the steps of:
 feeding said rope between a first and second elongate rotating chains, each said chain defining a plurality of mutually engageable open die cavity portions simultaneously closing a plurality of said die cavity portions about said rope along an extended length to cut said rope into said discrete pieces, wherein said number of said closed die cavities is at least about 10, wherein said first and second chains are rotatable at a speed of from about 30 m/min to about 200 m/min, and wherein each of said first and second chains has a major diameter length and said chain defines a length of said plurality of simultaneously closed die cavity portions, and wherein the ratio of said length of said plurality of simultaneously closed die cavity portions to the major diameter length is from about 0.3-0.6 to 1.

4. A method of claim 3, further comprising the step of having an dwell time, wherein said dwell time is between about 0.1 seconds to about 0.5 seconds.

5. A method of continuously forming a plurality of discrete pieces of a center-filled confectionery product from an elongate rope thereof comprising the steps of:
feeding said rope between a first and second elongate rotating chains, each said chain defining a plurality of mutually engageable open die cavity portions simultaneously closing a plurality of said die cavity portions about said rope along an extended length to cut said rope into said discrete pieces; and urging one of said chains into said engagement with said other chain to maintain said plurality of said die cavity portions in said closed position, wherein said number of said closed die cavities is at least about 10, and wherein each of said first and second chains has a major diameter length and said chain defines a length of said plurality of simultaneously closed die cavity portions, and wherein the ratio of said length of said plurality of simultaneously closed die cavity portions to the major diameter length is from about 0.3-0.6 to 1.

6. A method of claim 5, wherein said dwell time is between about 0.1 to about 0.5 seconds.

7. A method of claim 5, wherein said chains are rotatable at a speed of from about 30 m/min to about 200 m/min.

8. A method of improving the output of a chain type cutting apparatus having a pair of rotary chains including a plurality of die cavity portions which are mutually engageable to form a plurality of closed die cavities to continuously cut a rope of center-filled confectionery product into individual pieces; the method comprises the steps of:
establishing a minimal dwell time to maintain said rope in said mutually engageable closed die cavities; and
establishing the number of said closed die cavities and speed of rotation of said rotating chains such that at least said minimum dwell time is maintained, and
wherein each of said first and second chains has a major diameter length and said chain defines a length of said plurality of closed die cavities, and wherein the ratio of said length of said plurality of closed die cavities to the major diameter length is from about 0.3-0.6 to 1.

9. A method of claim 8, wherein said chains are rotatable at a speed of from about 30 m/min to about 200 m/min.

10. A method of claim 8, wherein said dwell time is between about 0.1 seconds to about 0.5 seconds.

11. A chain type cutting apparatus for continuous cutting of a rope of a center-filled consumable product into individual pieces comprising:
a first continuous elongate rotary chain defining a plurality of first open die cavity portions; and
a second continuous elongate rotary chain defining a plurality of second open die cavity portions;
said first and second die cavity portions being mutually engageable to form a plurality of closed die cavities about said rope of product, thereby forming said pieces, said product remaining within said closed die cavities for a dwell time;
wherein each of said first and second chains has a major diameter length and said chain defines a length of said plurality of closed die cavities and wherein the ratio of said length of said plurality of closed die cavities to the major diameter length is about 0.3-0.6 to 1.

12. A chain type cutting apparatus of claim 11, wherein said chains are rotatable at a speed of from about 30 m/min to about 200 m/min.

13. A chain type cutting apparatus of claim 11, wherein said dwell time is between about 0.1 seconds to about 0.5 seconds.

* * * * *